July 17, 1956 C. H. PHELPS 2,754,686
SUPPORT MEANS FOR BALANCING MACHINES
Filed Aug. 8, 1952 2 Sheets-Sheet 1
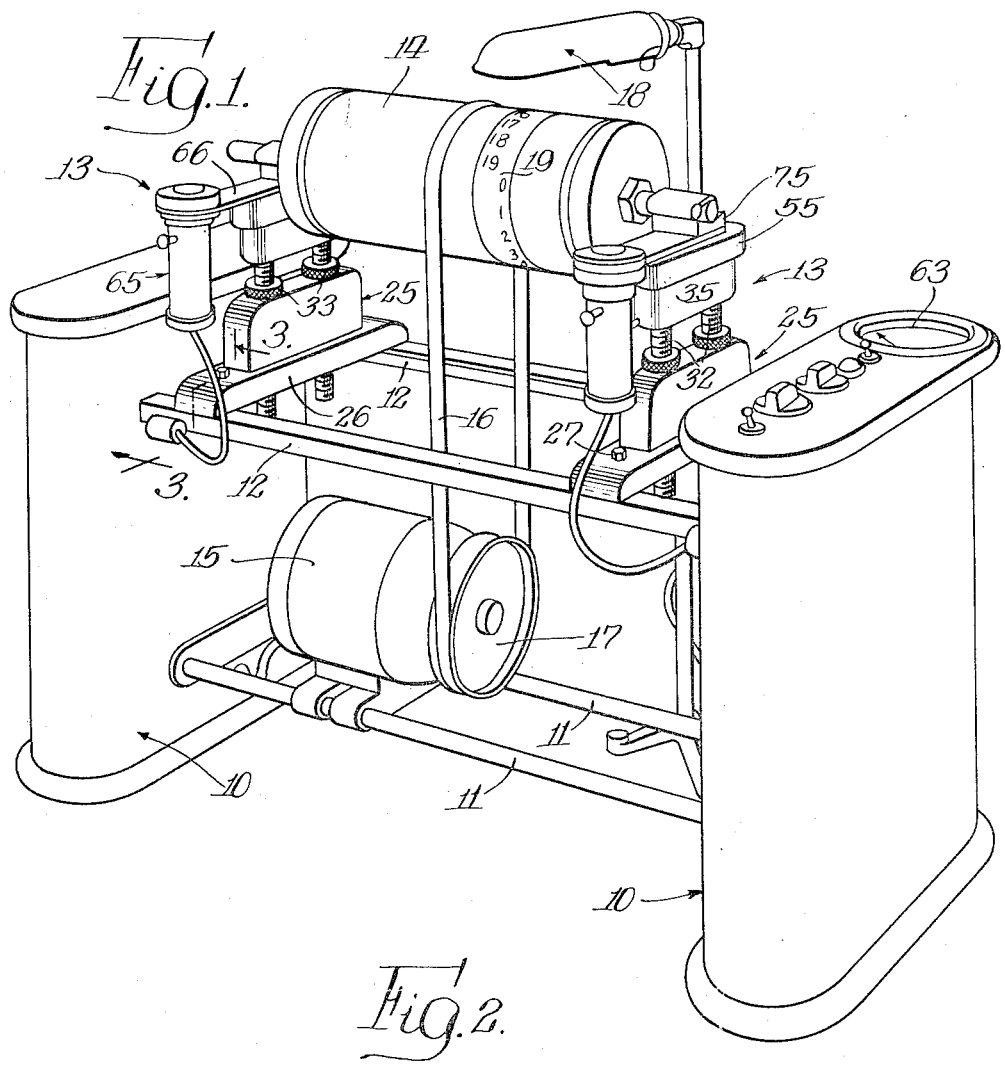
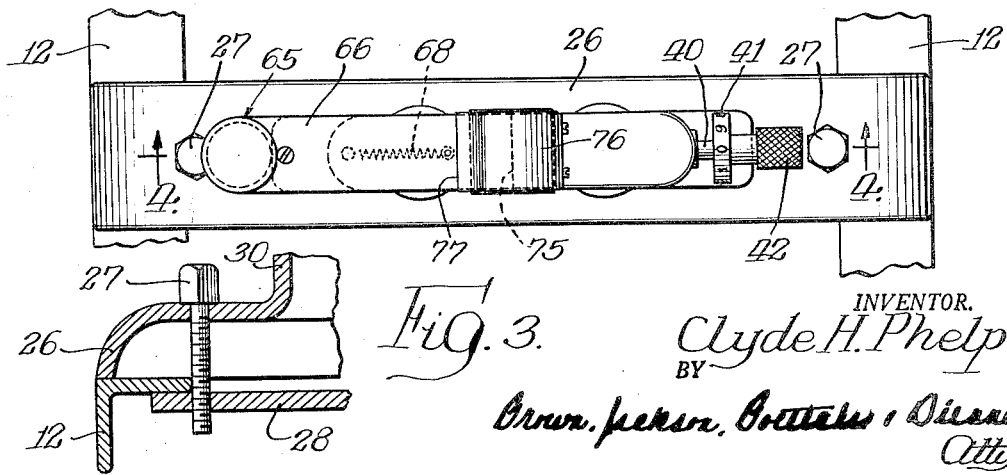
INVENTOR.
Clyde H. Phelps July 17, 1956
C. H. PHELPS
2,754,686
SUPPORT MEANS FOR BALANCING MACHINES
Filed Aug. 8, 1952
2 Sheets-Sheet 2
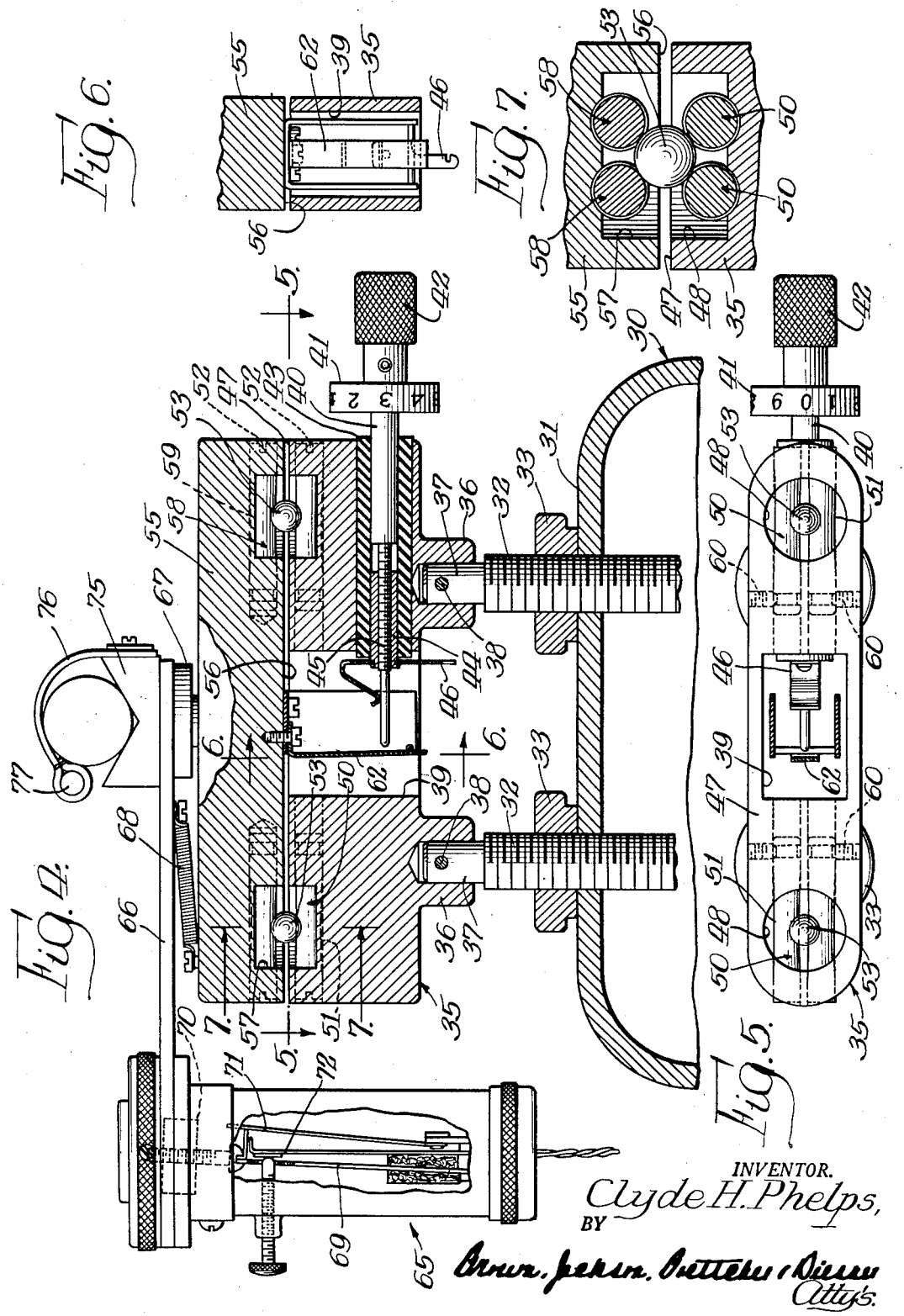
INVENTOR.
Clyde H. Phelps,
BY
Attys.

United States Patent Office 2,754,686
Patented July 17, 1956

2,754,686

SUPPORT MEANS FOR BALANCING MACHINES

Clyde H. Phelps, Springfield, Ill., assignor, by mesne assignments, to Raydyne Corporation, Springfield, Ill., a corporation of Illinois Application August 8, 1952, Serial No. 303,262

5 Claims. (Cl. 73—477)

My present invention relates generally to balance testing machines and in particular to a new and improved means for supporting a rotor or rotatably driven mass so that the same may oscillate freely in a single plane.

In the manufacture of any article, whether cast, forged, rolled, formed, extruded or otherwise produced or assembled, imperfections occur especially as to weight distribution. Such imperfections are due to limitations inherent in the process of manufacture or arise as a result of assembly, as in such items as a crank shaft with an attached flywheel or an armature having complex windings. Rotating parts in motors, machines and appliances, in particular, are designed today for higher rotational speeds and lighter weights. Since the forces exerted by unbalance in such items increase as the square of the rotational speed of the item, it has become necessary for the successful operation of such modern machinery having rotational masses embodied in its function, to perfect a precision balancing of the rotating parts, for the factors and effects of unbalanced forces are increasingly outstanding at the higher speeds of operation. Proper balancing improves the operation of such equipment and enhances its value by reducing undue wear and vibration and consequently maintenance costs. Engineers have recognized the magnitude of importance of unbalanced forces in such high speed rotational masses in particular and have therefore devised, in the past, machines of various designs adapted to enable one to reduce or minimize the effect of unbalance forces. In general such balancing machines have included means for supporting or suspending a rotated mass to be correctively balanced so that the oscillations thereof due to unbalanced forces will be restricted to a single plane wherein they can be measured and counteracted. Such means for restrictively mounting the rotating mass for free oscillatory movement in a single plane have taken on a variety of forms, such as the use of flexible columns for supporting bearing carriages or the suspension of bearing carriages from flexible wires, or the like. In my instant invention I propose to demonstrate the features of a new and improved rotor supporting system for use in a balancing machine which has embodied therein several new and improved concepts and features which make the same more desirable than previous devices of this nature both from an operational and manufacturing standpoint.

Briefly the supporting system of my new and improved balance testing machine is devised to include the action of a plurality of ball bearings so arranged in assembly as to support the bearing load of the rotor or rotating mass while permitting the same to move freely in a single plane. Vertical adjustment of the ball bearing support system and the bearings themselves is provided for adapting the machine of my instant invention to receive rotating masses having a central shaft formed with unlike diameters at opposite ends of the mass so that the mass may be leveled for rotation in the balance testing machine. Further, the new and improved rotor mounting structure and supporting system of my instant invention is adapted to provide freedom of motion both lateral and rotational of the mass with low frictional resistance, while maintaining substantial rigidity in the longitudinal or axial direction of the rotor to thereby combat end thrust.

The main object of my present invention is to provide a new and improved means for supporting a rotor or rotating mass so that the same may oscillate freely with a low value of dampening in a single restrictive plane of permissible movement.

Another object of my invention resides in the simple low cost adjustable bearing system employed therein which utilizes a novel ball bearing race structure.

A further object of my invention resides in the provision of a simple screw adjustment for leveling the rotor supporting structure regardless of the level position of any surface on which the supporting structure is mounted.

Still another important object of my invention is the provision of a rotor mounting structure so constructed and arranged that the rotor is free for movement both lateral and rotational with low friction, but is supported substantially rigidly in a longitudinal direction or along its longitudinal axis thereby providing end thrust for axial loading.

A still further object of my invention is the provision of a V-type bearing means for use in a balance testing machine coupled with a simple screw adjustment whereby rotors having different diameter shaft extensions at their opposite ends may be leveled for rotation.

Another object of my invention is to include in the new and improved rotor supporting structure of the balance testing machine of my instant invention means for indicating oscillation of the rotating mass at the supporting bearings therefor with such indicating means demonstrating that part of the oscillation which is rotational while excluding that part of the oscillation which may be in translation.

Still another object of my present invention is to demonstrate the features of a new and improved rotor supporting system including an indicating means capable of indicating oscillatory motion of the rotating mass either in translation or rotation or any combination of the two.

The above and further objects and features of my present invention will be recognized by one familiar with the art from the following detailed description and specification thereof and with reference to the illustrative embodiment of its features as shown in the accompanying drawings.

In the drawings:

Figure 1 is perspective frontal view of a balance testing machine embodying the features of my present invention;

Figure 2 is an enlarged top plan view of a portion of the rotor supporting system employed in the balance testing machine of Figure 1 and showing in detail certain features thereof;

Figure 3 is an enlarged partial cross sectional view taken substantially along line 3—3 of Figure 1 and looking in the direction of the arrows;

Figure 4 is an enlarged cross sectional view taken substantially along line 4—4 of Figure 2 illustrating in detail the features of the rotor supporting system of my present invention;

Figure 5 is an enlarged top plan view taken from the vantage line 5—5 of Figure 4, looking in the directoin of the arrows, and showing the lower ball bearing race features eemployed in the rotor supporting system as demonstrated in Figure 4 of the drawings;

Figure 6 is an enlarged detail partial cross sectional view taken substantially along line 6—6 of Figure 4 and demonstrating the details of a translatory motion indicating system employed with the mechanism illustrated in Figures 4 and 5; and Figure 7 is an enlarged partial cross sectional view taken substantially along line 7—7 of Figure 4 and illustrating in detail the ball bearing race system employed in the rotor supporting system of Figure 4.

Turning now to the features of the balance testing machine as demonstrated in Figure 1 of the drawings, it will be seen that the same includes a pair of ground engaging pedestals 10, 10 spaced in the vertically upright position and interconnected by lower cross rails 11, 11 mounted in parallel spaced relation beneath similar upper cross rail supports 12, 12. A pair of rotor supporting structures indicated generally at 13, 13 are mounted in spaced relation across the upper cross rails 12, 12 for supporting a rotor 14 to be balanced. Means for rotatably driving the rotor 14 include an electrical motor 15 mounted on the lower cross rails 11, 11 adapted to drive a belt means 16 trained around the rotor and over a sheave wheel 17 driven by motor 15. A conventional stroboscopic lamp means 18 is included for indicating the angular disposition of unbalanced forces in the rotor by cooperating with an index band 19 mounted about the body of the rotor according to known practice.

The combination of the pedestal members 10, 10 and the interconnecting horizontal cross rail frame members 11 and 12, makes for a rigid ground engaging supporting structure suitable for a balance testing machine of this character. The material utilized for the pedestal and cross bar frame members should be of sufficient strength and rigidity to support the vertical loading of the rotor supporting means 13 thereon and the additional weight of the rotor 14 to be balanced, with such materials as steel, ferrous alloys or the like being preferred for this purpose.

With particular regard to the rotor supporting system which comprises the two rotor supporting structures 13, 13 of my instant invention, it will be recognized from Figure 1 especially that each rotor supporting means includes a hollow base member 25 mounted on the upper cross rails 12, 12 and comprising a hollow casting of a suitable ferrous alloy bearing the requisite strength required for such a purpose. Each hollow cast base member 25 is formed with a rail engaging foot portion 26 of substantially rectangular profile, as demonstrated in Figure 2, and having provision at its opposite ends for the introduction therethrough of a tie bolt means 27 threadingly engageable with an underlying clamp bar 28. Mounting of the base member in bridging relation of the upper spaced cross rails is accomplished simply and expediently by placing the foot portion 25 of each base member on the upper sides of the angle iron rails 12, 12 as seen in particular in Figure 3 of the drawings, and tightening the tie bolts 27 to engage the clamp bar 28 firmly with the underside of the upper cross rails. In this regard two tie bolts and one clamp bar are sufficient for firmly clamping each base member 25 in place on the cross rails 12, 12. It will also be recognized that by such an arrangement longitudinal adjustment of the spacing between the two employed bearing support structures is made conveniently possible. Formed integrally with each foot portion 26 of the base members is a centrally disposed hollow vertical wall portion 30 adapted to receive through an upper end wall 31 thereof, a pair of spaced adjusting bolts 32, 32. A knurled adjusting nut 33 is threadingly mounted on each bolt 32 above the upper end wall 31 of the base wall portions 30 so that such nuts engage the upper walls 31 in their normal assembled relation on the adjusting bolts. This provides opportunity for the threading vertical adjustment of each of the adjusting bolts independently for purposes of leveling the rotor and adapting the machine to receive rotors having different size axle or shaft extensions.

Mounted across the upper ends of each pair of adjusting bolts 32 is a lower ball bearing race block 35 having spaced boss members 36, 36 depending from the lower side thereof for receiving reduced upper end portions 37 of the adjusting bolts 32. Rigid connection between the upper ends of the adjusting bolts and the lower ball bearing race block is accomplished simply by pin fastener members 38, 38. From Figures 4 and 5 in particular, it will be recognized that each lower ball bearing race block 35 contains a vertically extending rectangular opening 39 disposed centrally thereof. A micrometer adjusting screw 40, having an index dial 41 formed integrally therewith and a knurled operating knob 42, extends horizontally through block 35 to invade opening 39 from one side thereof. The micrometer screw 40 is insulated from block 35 by means of a surrounding cylindrical insulating bushing 43 having an internally threaded metal sleeve member 44 disposed for the reception of a threaded end portion 45 of the micrometer screw 40. A connective lead terminal 46 is connected to one end of the sleeve member 44 and is provided with an opening for the passage and contacting of the micrometer screw thereby connecting the same in circuit as will be amplified later herein.

Formed inwardly of an upper surface 47 of the lower ball bearing race block and symmetrically positioned adjacent each end thereof on opposite sides of central opening 39 are cylindrical openings 48, 48 as shown in Figures 4 and 5. Extending horizontally through each of these openings and disposed parallel to the longitudinal axis of the lower ball bearing race block 35, are a pair of lower ball bearing race rods 50, 50; there being four such rods associated with the lower ball bearing race block, one at each end of each of the cylindrical openings 48. It will be recognized that each of the race rods 50 comprises a short length of a substantially cylindrical metal rod ground inwardly intermediate its ends, as at 51, to form a somewhat conical or hour glass configuration thereon, the purpose of which will be appreciated more fully presently. The outer end of each of the race rods 50 is provided with a suitable screw driver receiving slot 52 for assisting one in rotating such rods. As will be recognized from examination of Figure 7, the lower ball bearing race rods are disposed in paired side-by-side spaced relation, with the hour glass configuration thereof cooperating to provide a track for the rolling reception and guidance of a single ball bearing 53. Further the arcuately ground surfaces 51 on the rods 50 serve to provide up-hill inclines at the opposite ends of the ball bearing race so formed to maintain the ball bearings 53 in proper operational alignment or centered of the length of the race. This centering feature thus provides a means for gravitationally centering items supported thereover ot their mid-point of oscillation as defined by the mid-point of the races, for example, as with the rotor to be tested.

Mounted above the lower ball bearing race block 35 is an upper ball bearing race block 55 of similar construction in that the lower face 56 thereof is provided with vertically indented cylindrical openings 57 formed to register in neutral position of block 55 with like cylindrical openings 48 of the lower ball bearing race block. Through each of the openings 57 an additional pair of upper hour glass shaped race rods 58 having ground out surfaces 59 are extended. It will be appreciated that the pairs of upper and lower race rods cooperate in assembly to form races or cages for the two ball bearings utilized and that with such an arrangement the upper ball bearing race block is free for translatory motion relative to the lower block 35. Also it will be recognized that the two ball bearings 53 are each restricted in their translatory motion and guided in rectilinear movement between the four race rods as illustrated in Figure 7 of the drawings in particular.

Since the continued oscillation of the upper race block 55 relative to the lower race block 35 on the rolling support provided by the ball bearings 53 and cooperating race rods 50 and 58 will eventually lead to the wearing of the arcuate or hour glass surfaces 51 and 59 formed in the race rods, it is contemplated that a convenient and expedient means is necessary to prevent this feature from impairing operation of the support system. To this end, the screw driver slots 52 are provided in the outer ends of each of the race rods to permit the operator to rotate such rods slightly and thus present a new bearing surface to the associated ball bearings. Having once positioned the race rods in the desired rotational relationship to present such a new bearing surface for the ball bearings, such race rods may be locked in position by means of lock screws 60 or the like.

Associated in depending relation and disposed centrally of each upper ball bearing race block, as shown in Figures 4 and 6, is a spring contact arm 62 of an indicator system having the requisite characteristics described in my now abandoned application Serial No. 303,261, filed August 8, 1952, and entitled Unbalance Indicator. Each spring contact member is held rigidly in place on its related race block 55 and is designed to engage the adjacent end of the mircometer adjustment screw 40 for initiating illumination of the stroboscopic lamp 18 and a visual meter 63 located in the top of one of the ground engaging pedestals 10, as shown in Figure 1 of the drawings. It will be understood from Figure 4, in particular, that the indicator system comprising the micrometer screw 40 and spring member 62 makes for a simple contact system which when used in combination with a simple vacuum tube switching circuit, arranged to trip the stroboscopic light each time contact is made between these two members or broken therebetween, permits the indication on index band 19 of angular position of unbalance in rotor 14 according to recognized practice.

Also associated with each movable upper race block 55 is a second indicator system shown as generally at 65 embodying the concepts and teachings as set forth in my Patent No. 2,740,297, issued April 3, 1956, and entitled Balance Testing Means. It will be recognized that indicator system 65 is mounted for rotational adjustment about its own vertical axis at the end of a pivotally movable arm 66 carried by a rotatable post member 67 mounted in ball bearing means (not shown) housed centrally in the upper face of the movable race block 55 and carried therewith. A spring means 68 interconnects arm 67 and the upper ball bearing race block to prevent free rotary motion of the arm member 66 about its pivotal connection with the block 55. The second indicator 65 is designed to especially detect vibration of the rotor created by a very small unbalance which, even through the rotor may be revolved at high speed, will result in very little vibratory motion. Since it is desirable to have some means capable of amplifying the small motion presented by small unbalances indicator 65 is designed for this purpose consisting of a spring mass system including a flexible spring reed 69 and an adjustable weight 70 at the other end of the reed, which is mounted in cantilever fashion for vibrational oscillation about its lower end. Such a spring mass indicator system is preferably seismically mounted with the spring reed being tuned and operated at selected speeds of rotation for the rotor above or below resonance of the reed so that the indicator magnifies the vibration or oscillation due to small unbalance present in the rotor. Indicator 65 is adapted through contact arms 71 and 72 to electrically initiate a simple vacuum tube switching system arranged to trip the stroboscopic light 18 and meter 63 as with the translation indicator system heretofore discussed. It will be understood that the rotational indicator 65 is designed to detect vibrational motion due to unbalance of the rotating rotor causing oscillation thereof about a null point or axis transverse to its longitudinal axis of rotation. Stated in other words, an unbalanced mass supported for rotation on bearing centers, but which is free to move in a single plane, for instance in a horizontal plane as illustrated herein, will either oscillate about a null point or axis prependicular to its plane of free movement, translate in that plane parallel to its own longitudinal axis of rotation or move with a combination of both oscillation and translation. Such vibrationally induced movements of the mass will occur at the bearing centers or supports for the mass, for example, at the pivotal bearings provided by posts 67 herein. Thusly for example, pure rotational oscillation of the mass might occur at the center of the bearing supports, which are pivotal as described by means of the assembly of arm 66 and pivot post 67. Consequently, if all translation at the bearing support is reduced to zero, or if all rotational motion at and about the bearing supports is reduced to zero complete balance is obtained for the rotor. By including both the rotational and translation indicators in my present machine, I am able to indicate either rotation or translational motion of the rotor at both the bearing supports thereby to effect corrective balancing.

In additional to the pivotally movable supporting arm 67 which supports the rotational indicator 65 at its outer end, each movable bearing race block 55 is also provided with a V-block bearing support 75 for receiving the projecting end of the rotor's axis or axle, substantially as illustrated in Figures 1 and 4 of the drawings. In conjunction with the V-block support, a felt or other suitable materialed lubricating strip 76 is provided, such being attached at one end to one side of the V-block and having a weight 77 at its opposite end to provide a simple means of lubricating the axle ends and V-block supports.

With the arrangement of elements as described hereabove and recognizing that a rotor support system as I have described in detail is provided at each end of the rotor to be balanced so that the machine of my instant invention includes two such rotor support systems each with its translation and rotational indicators, it will be recognized that I have devised a new and improved means for supporting an unbalanced mass to be driven rotatably while permitting the same to oscillate freely in a single selected plane. Such restricted mounting of the rotor is provided by means of my new and improved ball bearing support means including the hour glass shaped ball bearing race rods and the ball bearing members themselves. In this regard, it is well to realize that unbalance oscillations of a rotating mass are substantially reciprocal at the bearing supports therefor so that the possibility of the movable ball bearing race block 55 disengaging from the underlying ball bearings is remote in a supporting system such as I have described in that movement of the block members 55 in one direction is counteracted by identical movement of such block in an opposite direction, all in harmonious response to the vibrational oscillations of the rotor across the restricted or given plane of permissible free oscillatory movement. Further the hour glass configuration of the ball bearing race rods assists the return of the movable ball bearing race blocks to their neutral center or mid-point of rectilinear motion so that when the rotor supports are loaded vertically by the weight of the rotating mass, a system is provided which automatically centers the mass at its mid-point of oscillation or amplitude of movement by means of gravity. Further it will be appreciated that the ball bearing support system as I have specified is free of the variable natural periods of vibration encountered with various weight rotors when using flexible column support systems heretofore known in the art and acts similar to the pendulum effects encountered by piano wire suspension systems in which the length of wire controls the frequency of the support system. Specifically, the arc or radius of the hour-glass indentation or curvature in the race rods of my system, determines the frequency for the support system. Therefore, it is fully contemplated that the concepts of my present teachings involve an advanced step over the prior art leading to a new and improved result and advancement in the art of balancing machines. Also it will be recognized and understood that numerous changes, modifications and substitutions of equivalents may be made in both the materials and design of the concepts of my present invention without departing from

I claim:

1. A rectilinearly reciprocal support means of the class described for supporting the ends of a rotating mass in a balance testing machine, comprising, a stationary block member, a movable block member in superposed registry with said stationary block member, bearing means pivotally carried on said movable block member for supporting the mass, there being recesses registeringly formed in opposed faces of said two named block members and adjacent their ends, pairs of rod-like members disposed in each of said recesses paralleling the line of motion for said movable block member, said rod members each being gradually decreased in cross-section toward a mid-section of minimum cross-section to define a pair of spaced coaxial raceways definitive of the rectilinear path for said movable block member, ball-bearing means interposed between said two named block members, one in each of said raceways for supporting said movable block member on said stationary block member, and adjustment means for horizontally leveling said stationary block member whereby gravity acts to automatically return said ball-bearing means and movable block member to a position wherein the mid-section of minimum cross-section for the rod members in each of said raceways register.

2. A rotor support means for use in a balance testing machine arranged to rotate a mass while permitting the same to oscillate freely in a single horizontal plane, comprising, at each end of the rotor, a stationary block member, a movable block member superposed adjacently parallel said stationary block member, each block member having at least two spaced recesses formed inwardly of one face, with the corresponding recesses of the two block members being registeringly opposed in the normal position of said block members, a pair of horizontally disposed rod means carried in each of said recesses, parallel to the line of motion for said movable block member, said rod members each reducing in cross-section toward a mid-section of minimum cross-section therefor so that each group of opposed pairs of said rods define a curvilinear raceway, the several raceways so formed being aligned coaxially, and ball-bearing means interposed between adjacent faces of said two block members, one in rolling engagement with each of said raceways to support said movable block member for rectilinear movement relative to said stationary block member.

3. A rotor support means for use in a balance testing machine of the type arranged to rotate a mass and permit its free oscillation in a single plane, comprising at each end of the mass, a stationary block member parallel to the said plane of free oscillation, a movable block member superposed adjacently parallel said stationary block member, said two named block members each having plural recessed openings extending inwardly of their opposed faces, a pair of parallel spaced rod members extending across each of said recessed openings, parallel to said plane of free oscillation and the path of travel for said movable block member, the pairs of rod members in said two block members being arranged in opposed, spaced parallelism, each rod member reducing in cross-section from adjacent its ends to a mid-section of minimum cross-section thereby to define a curvilinear surface intermediate its ends, the assembled pairs of rod members defining at least two coaxially aligned raceways, each of which converges at its opposite ends, and ball bearing means mounted in each raceway whereby said movable block member is freely supported for rectilinear reciprocation over said stationary block member; the formation of said raceways serving to gravitationally return said movable block member toward its position of mid travel as such reciprocates.

4. A rotor support means for use in a balance testing machine of the class described which is adapted to support a rotating mass while permitting the same to move freely in a single plane, comprising in combination, a pair of parallel spaced stationary block members, one of said block members disposed adjacent each end of the mass, a movable block member cooperatively positioned in superposed parallel position over each of said stationary block members, pivotal bearing means carried substantially centrally of each movable block member to receive and support one end of said mass, a plurality of substantially cylindrical rod members arranged in parallel pairs adjacent the ends of each of said block members, there being at least two sets of such rod members in each block member, each rod member being formed with a cross-section gradually reducing toward a mid-section of minimum cross-section thereof to define arcuately curved surfaces thereon, the said pairs of rod members of the movable block members being aligned in substantially superposed registry with the corresponding rod members in the stationary block members, ball bearing means interposed between such opposed pairs of said rod members; the cooperating adjacent pairs of said rod members in the two named block members forming longitudinally curvilinear races by virtue of such cross-sectional reduction thereof, which races serve to guide said ball-bearing means for rectilinear movement definitive of the path and limits of reciprocation for the movable block members, and adjustable means for regulating the elevation of said stationary block members at each end of the mass, whereby said mass may be leveled in the testing machine.

5. A support means for mounting a rotating mass for free oscillatory motion in a single plane, comprising adjacent each end of the mass, a rigidly mounted lower ball bearing race block, at least two longitudinally spaced pairs of race rods extending in spaced coplanar relation inwardly from opposite ends of said lower race block and across openings which recess inwardly of one face thereof, each of said rods being substantially cylindrical and having an arcuately double tapered surface formed by a reduction of the rod's cross-sectional area extending from adjacent its opposite ends toward a mid-section of minimum cross-section, an upper ball bearing race block superposed on said lower race block likewise having recessed openings extending inwardly of one face thereof, additional separated pairs of said race rods carried by said upper race block which are arranged in parallel superposed registry with the corresponding pairs of race rods in said lower race block, ball bearing members disposed between said two named race blocks, at least one in contacting engagement with each set of cooperating opposed pairs of race rods, the system so formed serving to support said upper race block freely for rectilinear reciprocation on said ball bearing members and over said lower race block; the cooperating adjacent pairs of race rods forming a guide means for said ball bearing means definitive of the rectilinear path of motion for the upper race block, the surfaces of said race rods providing a means for automatically returning the upper race block to its position of mid-travel by the effect of gravity; and pivotal bearing means carried centrally of the upper race block for supporting one end of said mass.

References Cited in the file of this patent

UNITED STATES PATENTS

| | | |
|---|---|---|
| 2,301,291 | Kolesnik | Nov. 10, 1942 |
| 2,343,575 | Penney | Mar. 7, 1944 |

FOREIGN PATENTS

| | | |
|---|---|---|
| 157,962 | Great Britain | Apr. 10, 1922 |